US011579041B2

(12) United States Patent
Goldman et al.

(10) Patent No.: US 11,579,041 B2
(45) Date of Patent: Feb. 14, 2023

(54) SWAPPABLE OPTICS MODULE FOR ADDITIVE FABRICATION DEVICES

(71) Applicant: Formlabs, Inc., Somerville, MA (US)

(72) Inventors: Andrew M. Goldman, Stow, MA (US); Henry Whitney, Weymouth, MA (US); Justin Keenan, Lexington, MA (US); Benjamin FrantzDale, Harvard, MA (US); Michael Fogleman, Cary, NC (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 238 days.

(21) Appl. No.: 16/818,886

(22) Filed: Mar. 13, 2020

(65) Prior Publication Data

US 2020/0292415 A1 Sep. 17, 2020

Related U.S. Application Data

(60) Provisional application No. 62/819,110, filed on Mar. 15, 2019.

(51) Int. Cl.
*B29C 64/393* (2017.01)
*G01M 11/02* (2006.01)
(Continued)

(52) U.S. Cl.
CPC ....... *G01M 11/0278* (2013.01); *B29C 64/386* (2017.08); *B33Y 30/00* (2014.12); *B33Y 50/00* (2014.12)

(58) Field of Classification Search
CPC .............................. B33Y 30/00; B29C 64/393
See application file for complete search history.

(56) References Cited

U.S. PATENT DOCUMENTS

| 5,133,987 A | 7/1992 | Spence et al. |
| 2009/0051935 A1* | 2/2009 | Cooper ................. B33Y 50/02 356/616 |

(Continued)

FOREIGN PATENT DOCUMENTS

| EP | 3 202 525 A1 | 8/2017 |
| WO | WO 2009/026520 A1 | 2/2009 |

OTHER PUBLICATIONS

PCT/US2020/022781, Jun. 23, 2020, International Search Report and Written Opinion.

(Continued)

*Primary Examiner* — Suresh Suryawanshi
(74) *Attorney, Agent, or Firm* — Wolf, Greenfield & Sacks, P.C.

(57) ABSTRACT

According to some aspects, calibration techniques are provided that allow an optics module of an additive fabrication device to be installed and operated in a stereolithography device by a user. In particular, the calibration techniques enable the optics module to be calibrated in a way that only depends on the characteristics of the optics module, and not upon any other components of the stereolithography device. As a result, the techniques enable a user of a stereolithography device to remove one optics module and replace it with another, without it being necessary to repair or replace the whole device. In some cases, the calibration techniques may include directing light onto one or more fiducial targets within the stereolithography device and measuring light scattered from said targets.

15 Claims, 18 Drawing Sheets

(51) Int. Cl.
  *B33Y 30/00*       (2015.01)
  *B33Y 50/00*       (2015.01)
  *B29C 64/386*      (2017.01)

(56) References Cited

U.S. PATENT DOCUMENTS

2018/0162053 A1\* 6/2018 Fujita .................. B23K 26/342
2018/0186082 A1\* 7/2018 Randhawa ............. B33Y 30/00

OTHER PUBLICATIONS

International Search Report and Written Opinion in connection with International Application No. PCT/US2020/022781, dated Jun. 23, 2020.

\* cited by examiner

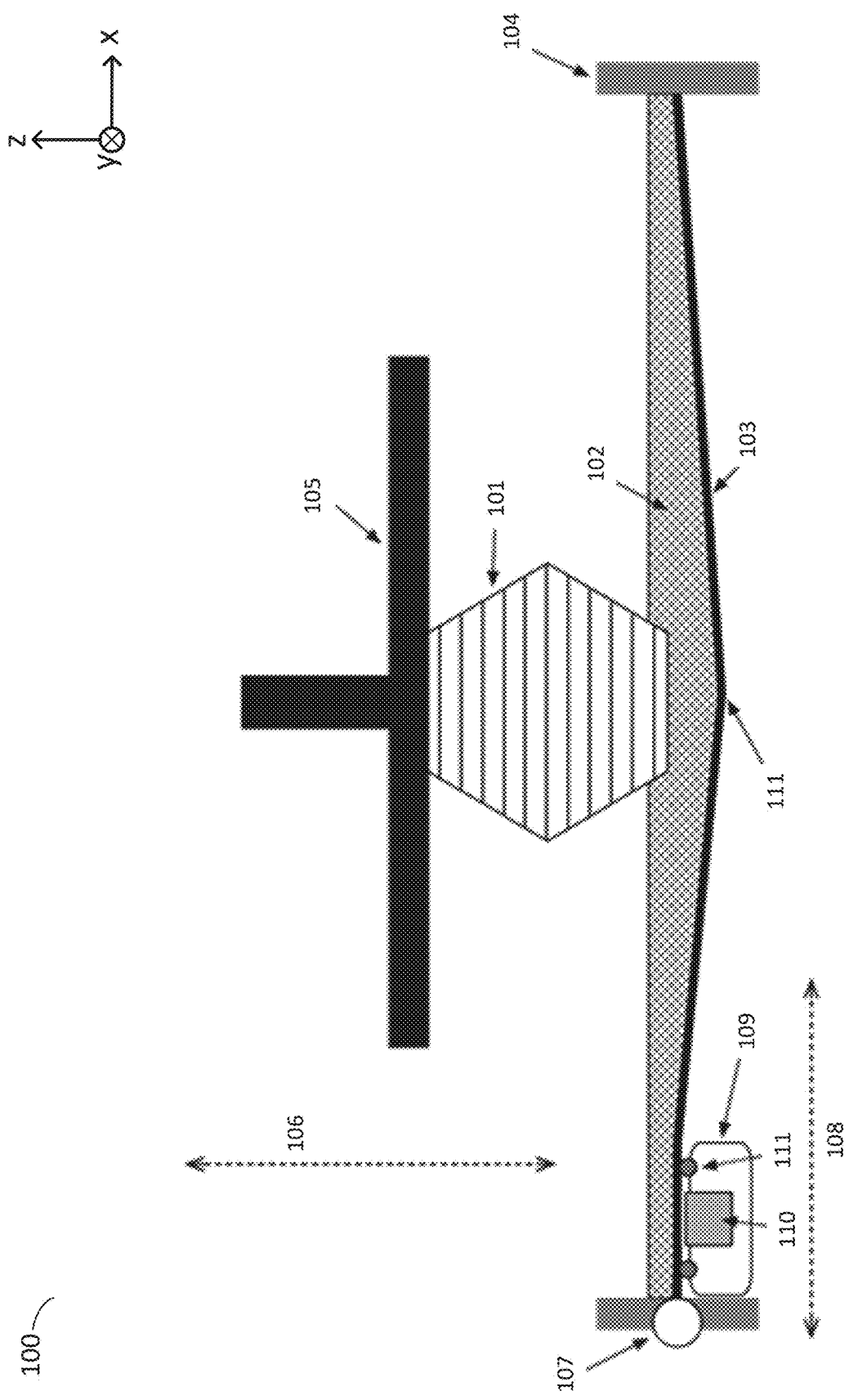

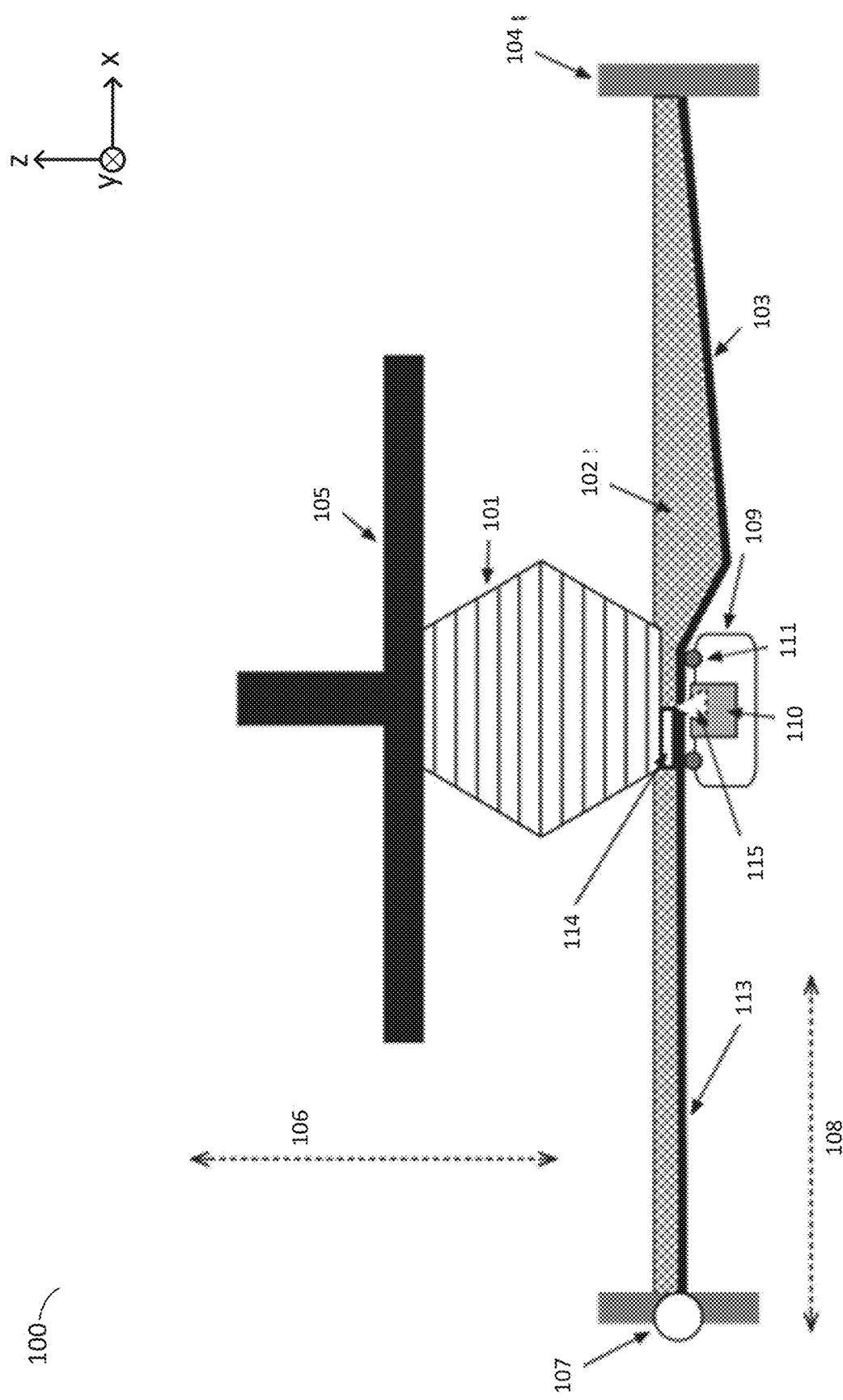

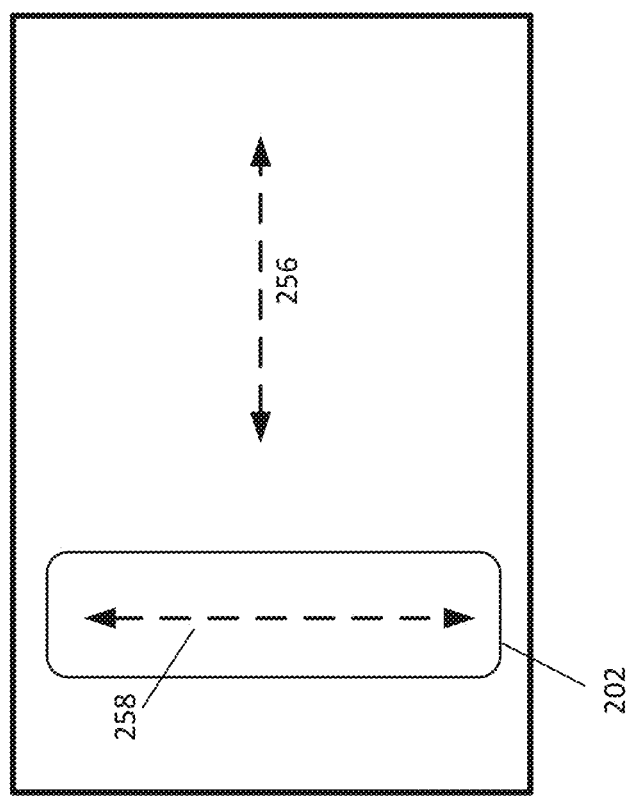
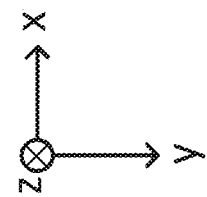
FIG. 2B

SWAPPABLE OPTICS MODULE FOR ADDITIVE FABRICATION DEVICES

CROSS-REFERENCE TO RELATED APPLICATIONS

The present application claims the benefit under 35 U.S.C. § 119(e) of U.S. Provisional Patent Application No. 62/819,110, filed Mar. 15, 2019, titled "Swappable Optics Module for Additive Fabrication Devices," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the object is formed by moving an area of incident actinic radiation across the layer of liquid resin to complete the cross section of the object being formed. An area of incident actinic radiation could be caused by any light source(s), such as by a laser.

SUMMARY

According to some aspects, a method is provided of calibrating an optics module for an additive fabrication device, the method comprising directing light from a light source of an optics module onto a plurality of locations on a calibration pattern within the additive fabrication device, the optics module comprising the light source, receiving light reflected and/or scattered from the plurality of locations on the calibration pattern by a light sensor, determining, using at least one processor based on the light received by the light sensor, a beam path traversed by the light from the light source, and determining, using the at least one processor, at least one correction to the determined beam path based at least in part on deviations of the determined beam path from a desired beam path.

According to some aspects, an additive fabrication device is provided comprising an optics module comprising a light source and a light sensor, a calibration pattern, at least one processor, and at least one computer readable medium comprising instructions that, when executed by the at least one processor, performs a method comprising directing light from the light source of the optics module onto a plurality of locations on the calibration pattern, determining, based on light received by the light sensor of the optics module, a beam path traversed by the light from the light source, and determining at least one correction to the determined beam path based at least in part on deviations of the determined beam path from a desired beam path.

According to some aspects, a method is provided of calibrating an optics module for an additive fabrication device comprising a light source and a light sensor, the method comprising directing light from the light source onto a plurality of locations on a first calibration pattern within the additive fabrication device, receiving light reflected and/or scattered from the plurality of locations on the first calibration pattern by the light sensor, directing light from the light source onto a plurality of locations on a second calibration pattern within the additive fabrication device, the second calibration pattern being arranged further from the light source than the first calibration pattern, receiving light reflected and/or scattered from the plurality of locations on the second calibration pattern by the light sensor, determining, using at least one processor based on the light received by the light sensor from the first calibration pattern and based on the light received by the light sensor from the second calibration pattern, a beam path traversed by the light from the light source, and determining, using the at least one processor, at least one correction to the determined beam path based at least in part on deviations of the determined beam path from a desired beam path.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1D illustrate a schematic view of a stereolithographic device that forms a plurality of layers of a part, according to some embodiments;

FIGS. 2A-2C illustrate schematic views of optically scanning fiducial targets of a stereolithographic device, according to some embodiments;

DETAILED DESCRIPTION

Figure 1C:
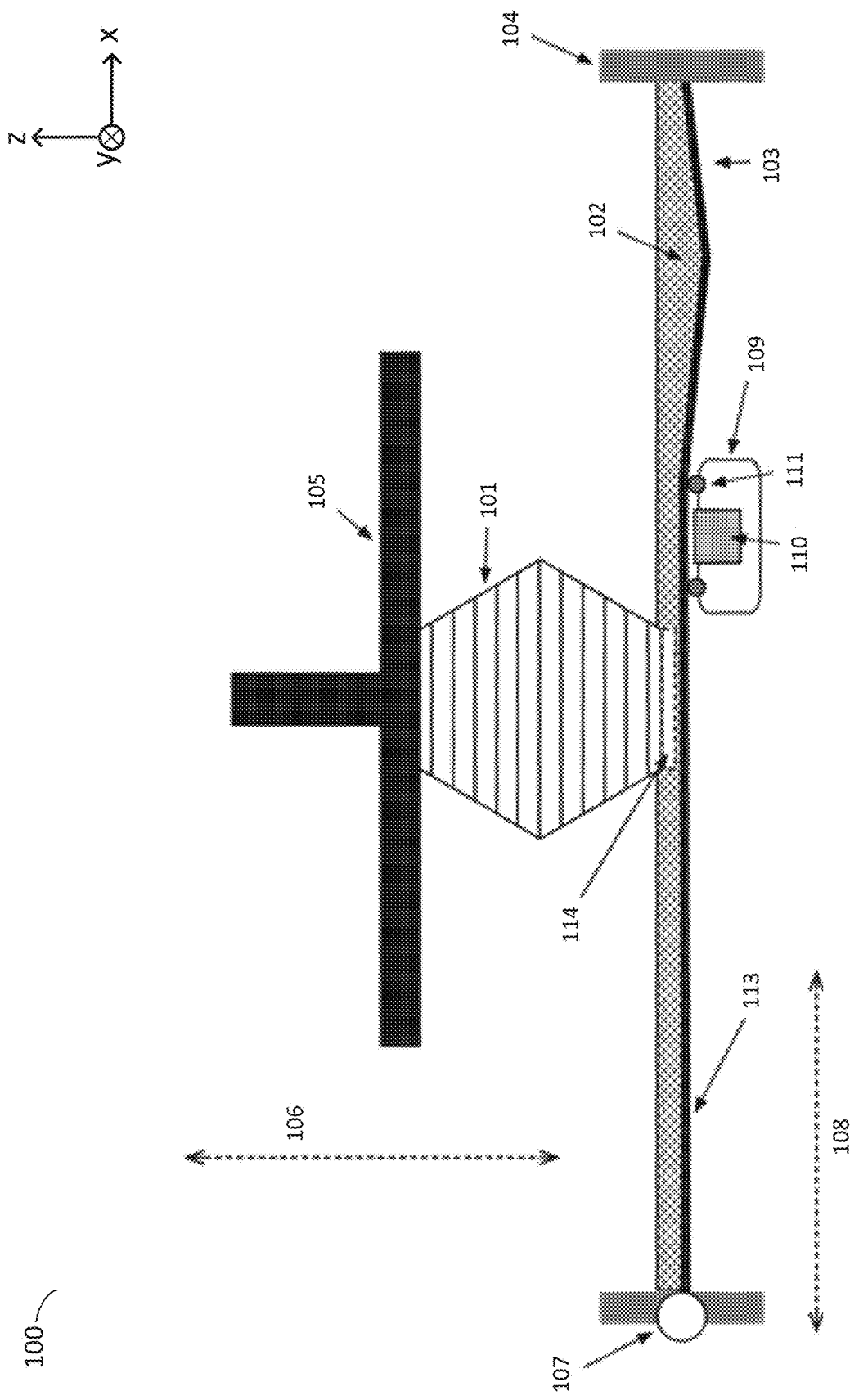

As discussed above, in stereolithography a plurality of layers of material are formed by directing actinic radiation onto a liquid photopolymer, which causes the photopolymer to cure and harden. Directing the radiation onto the liquid photopolymer is a precise process because it is desirable for additively fabricated parts to exhibit small details. In some cases, for instance, a light beam may be directed to a point within a two-dimensional build area with a precision on the order of hundreds or even tens of microns. As a result, optical components of a stereolithography device tend to include a number of precisely calibrated components. These components are also sensitive and/or potentially dangerous and therefore are typically concealed from a user during operation of the device.

One issue that may arise in stereolithography or other additive fabrication devices is that one of more of the optical components may fail. For example, components may wear or degrade over time, leading to sub-optimal performance and/or a complete failure to operate at all. Such an event typically results in a significant repair operation or a replacement of the additive fabrication device by the manufacturer because repair by a user of the device is simply not feasible due to the highly precise and sensitive nature of the components.

The inventors have recognized and appreciated calibration techniques that allow an optics module to be installed and operated in a stereolithography device by a user. In particular, the calibration techniques enable the optics module to be calibrated in a way that only depends on the characteristics of the optics module, and not upon any other components of the stereolithography device. As a result, the techniques enable a user of a stereolithography device to remove one optics module and replace it with another, without it being necessary to repair or replace the whole device.

In some embodiments, the calibration techniques may include directing light onto one or more fiducial targets within the stereolithography device and measuring light scattered from said targets. For example, a calibration pattern may be introduced into the stereolithography device and the stereolithographic device may be operated to scan features of the pattern with different responses to incident light to determine a position of the target. Such features may include different surface brightness and/or reflectivities. In some embodiments, a calibration pattern may be a fixed component of the stereolithography device in addition to, or alternatively from, a calibration pattern that may be introduced into the device.

According to some embodiments, one or more processors may generate one or more three-dimensional mappings between different components of a stereolithographic device. Successful use of an optics module may require calibration of the module's behavior in directing light into a build area of the stereolithographic device. This calibration may be obtained through a series of mappings that relate different calibration measurements to one another and may ultimately allow the module to be calibrated for the build area in a way that only depends on the characteristics of the optics module.

The calibration techniques described herein may be applied in any additive fabrication device in which a source of actinic radiation is provided within an optics module. For instance, while the techniques are described herein in the context of stereolithography, the calibration techniques described herein may also be applied in Digital Light Processing (DLP) or Selective Laser Sintering (SLS) devices, which also form parts by directing a beam of radiation onto a source material.

Following below are more detailed descriptions of various concepts related to, and embodiments of, techniques for calibration of an optics module. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

An illustrative stereolithographic device and stages of its operation are depicted in FIGS. 1A-1D, according to some embodiments. As shown in the example of FIGS. 1A-1D, stereolithographic device 100 includes a build platform 105 that is configured to adjust its position towards and away from tank 104 along an axis 106, referred to herein as the Z axis. The build platform 105 may support a part 101 being formed by the stereolithographic process.

In the example of FIGS. 1A-1D, the tank 104 may contain a volume of photopolymer resin 102 and comprise a bottom surface formed by a thin, flexible and/or elastic film 103, substantially transparent to actinic radiation 115. The film 103 may be held under tension by a tensioning device 107. An optics module 109 may be moved along axis 108, referred to herein as the X axis, such that roller elements 111 are in contact with the lower surface of the film 103. The optics module 109 comprises an exposure source 110 of actinic radiation 115 which selectively emits actinic radiation along its length (i.e., the axis running orthogonally to both axis 106 and 108, referred to herein as the Y axis). The optics module 109 further comprises roller elements 111 which are mounted to the top side of the optics module 109 opposing the bottom of the film 103.

In some embodiments, the film 103 may comprise any highly flexible and/or non-reactive material, such as Teflon® (or other fluoropolymer or polytetrafluoroethylene-based material, such as fluorinated ethylene propylene). The sides of the tank 104 may be comprised of a more rigid material, such as an acrylic plastic, or may alternatively may be formed of a flexible or compliant material.

According to some embodiments, the stereolithographic device 100 may be operated to fabricate an object, or part, 101 by selectively solidifying layers of photopolymer resin 102 onto build platform 105 by exposing the photopolymer resin 102 to a source 110 of actinic radiation 115. In particular, as shown in FIG. 1A, the build platform 105 may be moved along axis 106 to place the bottom of the build platform 105 or most recently formed layer of the part 101 in close proximity to the bottom plane of the tank 104 and the film 103. As the bottom film 103 typically has a certain degree of flexibility and/or elasticity, the weight of the photopolymer resin 102 and/or downwards pressure from the motion of the build platform 106 and part 101 may cause the film 103 to form a "sag" 112, or other form of depression.

In the example of FIG. 1B, optics module 109 has been moved along the bottom plane of the tank 104 through axis 108. During this motion, roller elements 111 may press upwards against film 103 in order to flatten any deflection in the film and ensure that the film forms a substantially flat plane between the roller elements in contact with the film. Also during the motion, an exposure source 110 may be activated in order to cause actinic radiation 115 to be selectively emitted at various points along the Y axis. Actinic radiation 115 emitted by the exposure source 110 may be transmitted through the film 103 and irradiate a layer of photopolymer resin 102 located between the film and the lower surface of the part 101. When exposed to the actinic radiation 115, the exposed portion of the photopolymer resin 102 may undergo various reactions, such as polymerization, causing the flowable resin 102 to solidify or otherwise adhere to the previously formed layer of the part 101, forming a new layer 114 of the part 101. As shown in the example of FIG. 1C, the optics module 109 may continue to move along the X axis while selectively exposing regions along the Y axis using the exposure source 110. Accordingly, any desired region within the X-Y plane of the bottom of the tank 104 may be selectively exposed to actinic radiation, causing polymerization of a new layer 114 of the part 101 in the desired shape.

Following exposure, the newly formed layer 114 may be in contact with both a previously formed layer and the film 103. While adhesion is desirable between the newly formed layer 114 and the prior layers of the part 101, unwanted adhesion may also be formed between the newly formed layer 114 and the film 103. As discussed above, an additional step is typically required to break such adhesive forces before the formation of a new layer, in a process referred to herein as "separation."

Figure 1D:
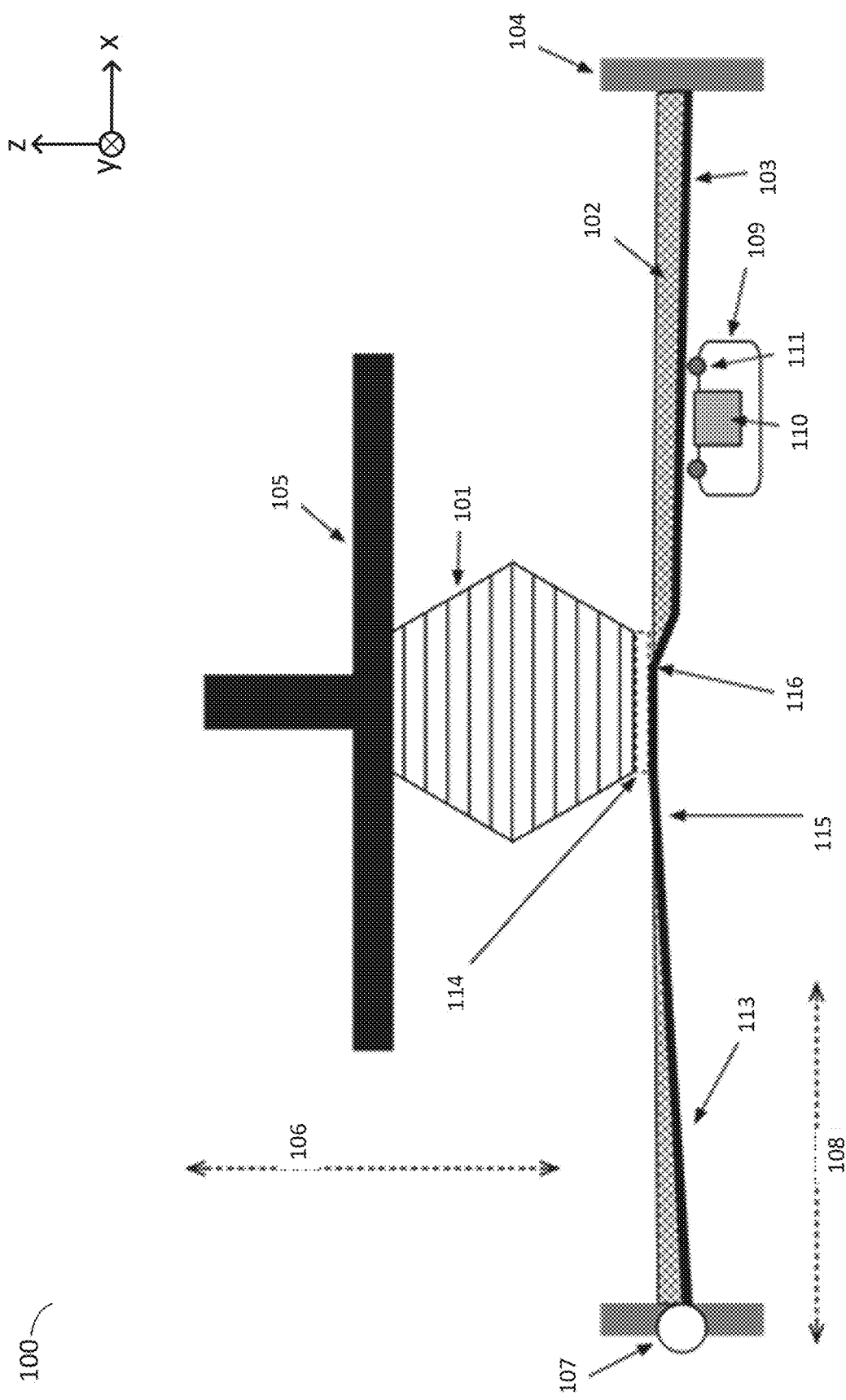

As shown in the example of FIG. 1D, one way of performing separation in illustrative stereolithographic device 100 is to lift the part 101, and thus newly formed layer 114, along axis 106, away from the film 103. Adhesive forces between the newly formed layer 114 and the film 103 may cause the film to deflect upwards 115 as the build platform 105 is moved away. Using a flexible, thin film as at least part of the floor of the container may allow a peeling edge to propagate inward from most or all of the outer edge of the contact area between the part 101 and the film 103. In particular, at a critical level of deflection, at least one portion of the film 103 may begin to separate, or peel, away from the newly formed layer 114, thus forming a peeling edge 116 which propagates across the interfacing surface of the film 103 and newly former layer 114. Separation of this manner may apply considerably less force to the part 101 compared with separation of a part from a rigid container having a release coating, as discussed above.

Following separation pictured in FIG. 1D, a new layer of the part 101 may be formed by returning to the configuration shown in FIG. 1A. In some embodiments, this may comprise returning the optics module 109 to its original position (as in FIG. 1A) without forming additional solid material. In other embodiments, however, the direction of the optics module 109 along axis 108 may be reversed, such that the formation process depicted in FIGS. 1A-1D occurs with the optics module 109 moving in the opposite direction.

In order to fabricate parts accurately, the exposure source 110 of optics module 109 must be calibrated so that it directs light to desired locations within the build area of the device 100 (that is, the area of the container in the X-Y plane in which solid material may be formed). In the case of the exposure source 110 comprising a laser and a mirror galvanometer, for example, calibration may comprise a relationship between galvanometer angle and build area position, which may differ across the build area.

The calibration techniques described herein are not limited to use with the type of stereolithographic device shown in FIGS. 1A-1D, and in particular, are not limited to a flexible container as shown and described. For example, the calibration techniques may also be applied to an optics module that directs light through a rigid container as shown in FIG. 9.

Figure 9:
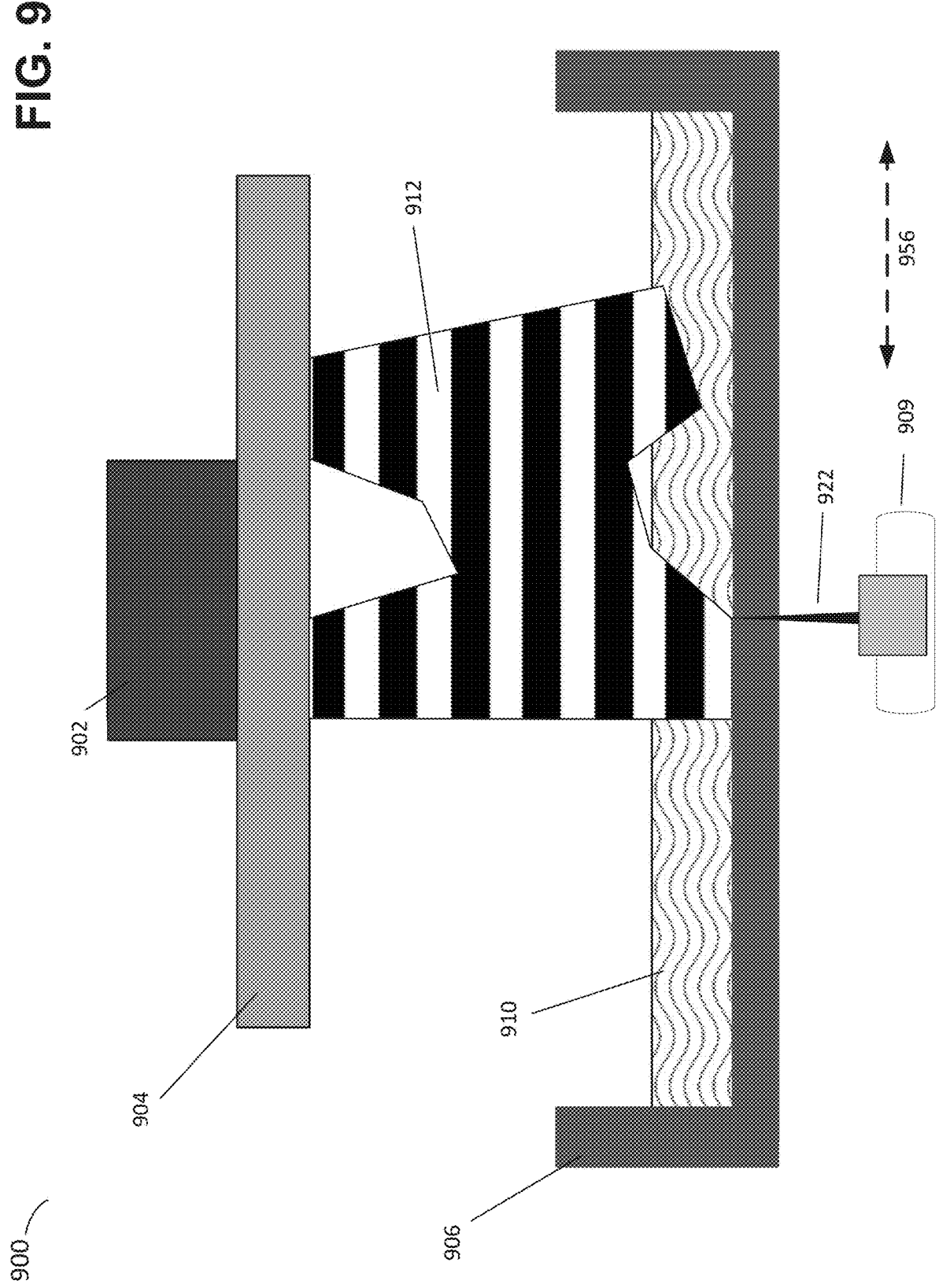
FIG. 9 illustrates a schematic view of a stereolithographic device with a rigid container, according to some embodiments.

An illustrative additive fabrication system is depicted in FIG. 9. Illustrative stereolithographic printer 900 forms a part in a downward facing direction on a build platform such that layers of the part are formed in contact with a surface of rigid container 906 in addition to a previously cured layer or the build platform. In the example of FIG. 9, stereolithographic printer 900 comprises build platform 904, container 906 and liquid photopolymer 910. A downward facing build platform 904 opposes the floor of container 906, which contains a liquid photopolymer (e.g., a liquid photopolymer resin) 910.

As shown in FIG. 9, a part 912 may be formed layerwise, with the initial layer attached to the build platform 904. In FIG. 9, the layers of the part 912 are each formed from the same material but are shown in alternating shades merely to visually distinguish them in this example. The container's base surface may be transparent to actinic radiation, such that radiation can be targeted at portions of the thin layer of liquid photocurable photopolymer resting on the base surface of the container. Exposure to actinic radiation cures a thin layer of the liquid photopolymer, which causes it to harden. The layer 914 is at least partially in contact with both a previously formed layer and the surface of the container 906 when it is formed. In order to cure the layer 914 by exposure to actinic radiation, the stereolithographic printer 900 may direct light 922 from optics module 909 into the build area.

In some embodiments, the optics module 909 may be fixed in place in the additive fabrication device and may be configured to direct the light 922 to any given point in a two-dimensional plane (e.g., by operating at least two mirror galvanometers to direct laser light to a desired X-Y position). Alternatively, optics module 909 may be configured to be moved along axis 956 while directing the light 922 along a single dimension (e.g., along an axis directed into and out of the page in the example of FIG. 9). In either case, the light may be directed to a desired location in a two-dimensional plane—either by keeping the optics module 909 fixed in place and directing the light along multiple axes via suitable optics, or by moving the optics module 909 along one axis while directing the light along another axis via suitable optics. Examples of calibration techniques for each of these two approaches are discussed below.

Figure 2A:
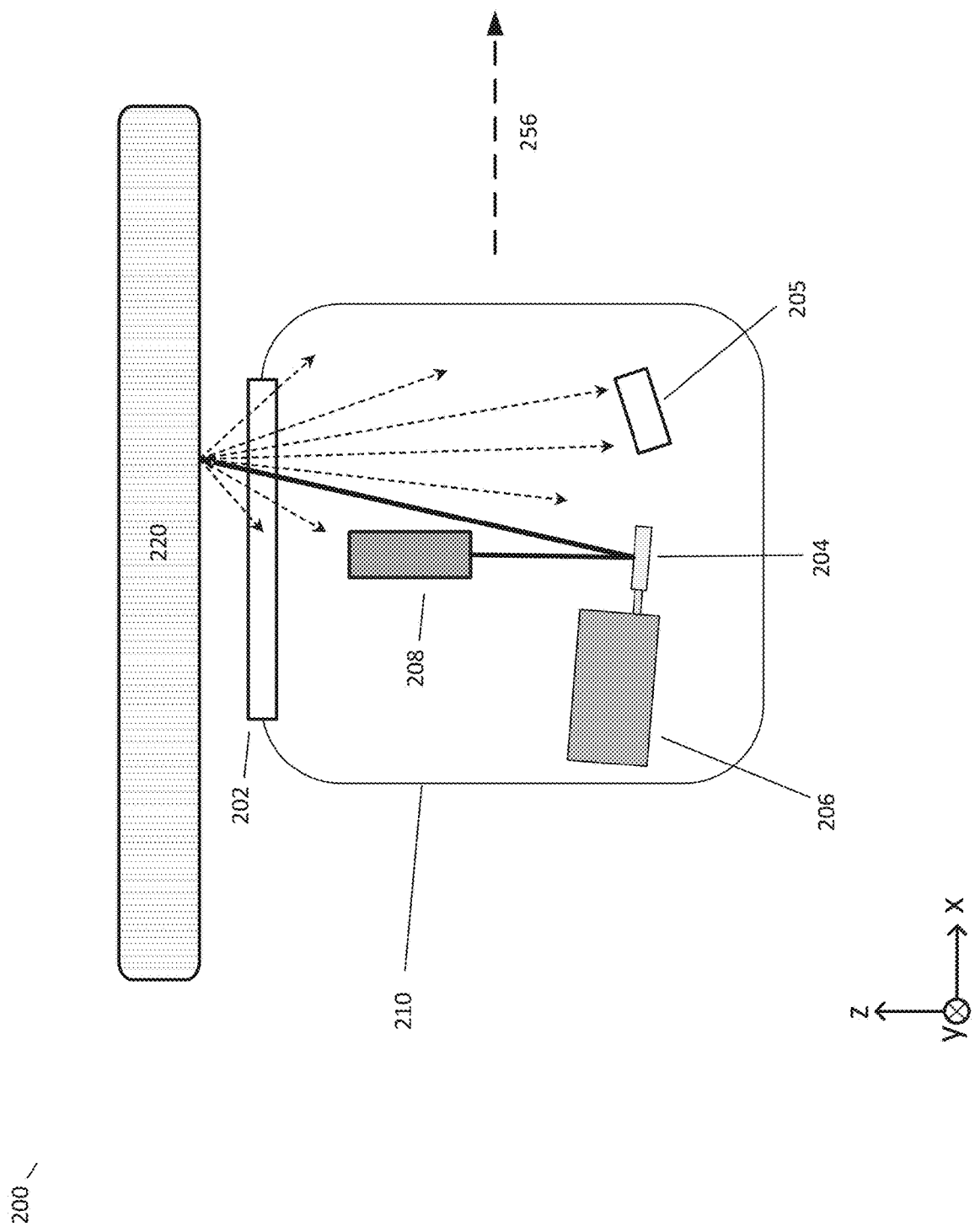
Figure 2C:
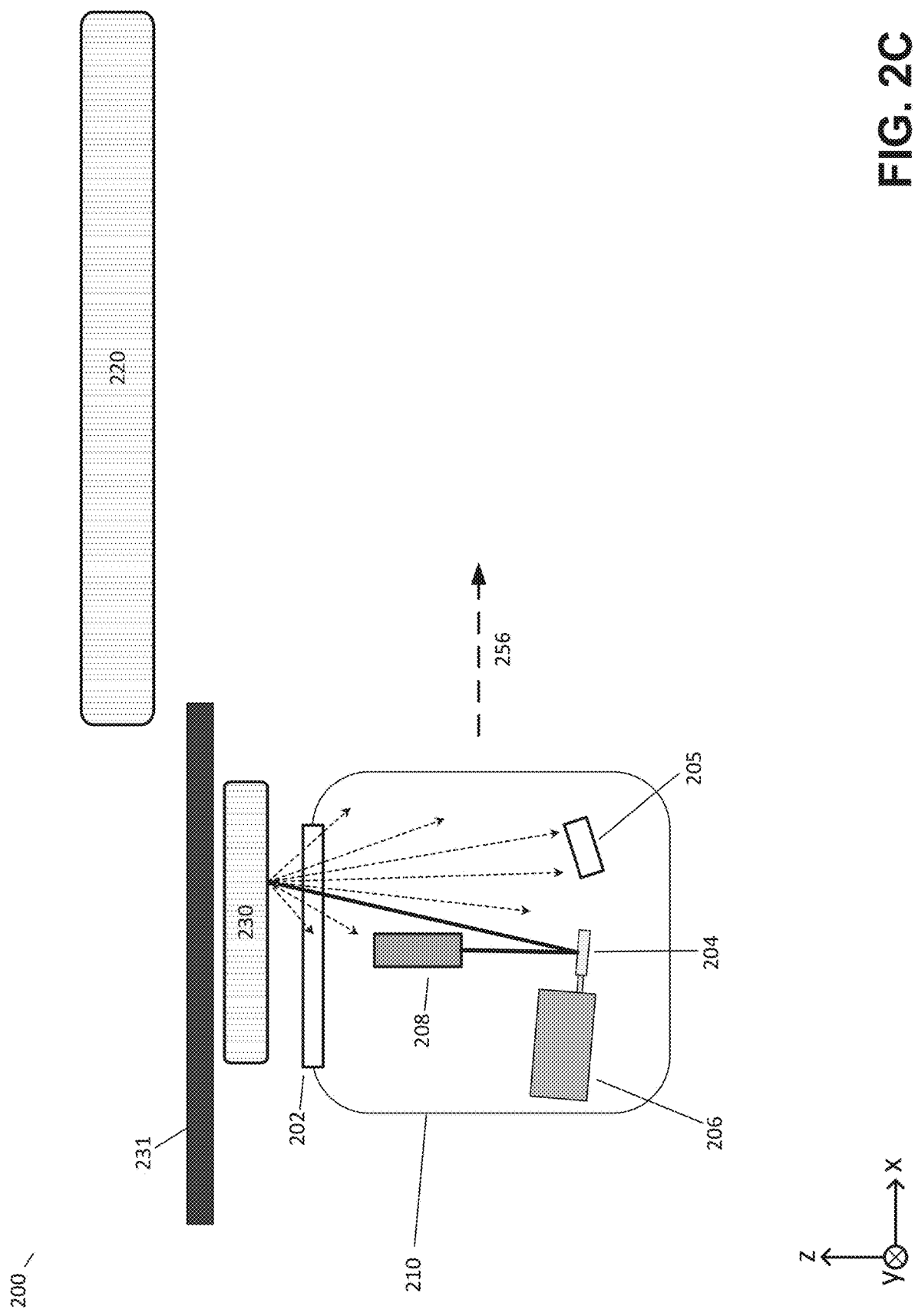

FIGS. 2A-2C illustrate schematic views of optically scanning fiducial targets of a stereolithographic device, according to some embodiments. In the example of FIG. 2A, an optics unit 210 is configured to move along an axis 256, and is operated to scan a calibration pattern 220 arranged within a build region of the stereolithographic device. In FIG. 2C, the same optics unit is operated to scan a calibration pattern 230 arranged within a "garage" of the stereolithographic device, which is a location along the X-axis in which the optics module may be parked when the stereolithographic device is not fabricating a part. The garage may keep the optics unit 210 protected as users insert or remove resin tanks or generally interact with other components of the device. This may limit the risk of contamination of the optical window 202 of the optics unit 210. In some embodiments the calibration pattern 230 may not be installed within the device, but may be removably affixed to a set location within the build area during use.

In FIGS. 2A and 2C, light source 208 of the optics unit 210 is arranged to direct light onto optical component 204, which may be, as a non-limiting example, a mirror and/or a lens. The light is then directed towards the optical window 202 by the optical component 204, and may pass through the optical window onto the calibration plate 220. Light incident upon the calibration plate 220 may be reflected back through the optical window 202, and light sensor 205 may receive at least some of the reflected light. At least one controller (not shown) coupled to the light sensor may determine a path of the light beam as incident onto the calibration plate based on the known position and direction of the light beam emitted onto the calibration plate and based on the intensity of the reflected light received.

In the example of FIG. 2A, optical component 204 may be controlled to direct light from the light source 208 to various positions along the y-axis by mechanical component 206, which may be a galvanometer according to some embodiments. The optical components such as optical window 104, light source 208, and light sensor 205 may be, as a group, moved in a direction along the x-axis 256 by a motor or other suitable actuator (not pictured). Additional lenses and/or mirrors to further control the light beam size, focus, and direction may be included in some embodiments. In this manner, light produced by the light source 208 may be scanned through a two-dimensional area, as described in the discussion of FIGS. 1A-1D. This area is also depicted in FIG. 2B, which shows the optical window 202 of the optics module through which light may be directed along axis 258; the optics module may also be moved along axis 256.

It may be appreciated that scanning light along the x-axis 256 and y-axis 258 may be accomplished in multiple ways. In particular, some embodiments may keep the optical window 202 and corresponding optical components stationary while moving the calibration plate 220 along the x-axis 256. Some embodiments may move the optical window 202 and corresponding optical components along both the x-axis 256 and the y-axis 258 while keeping the calibration plate 220 stationary. Some embodiments may move the calibration plate 220 along both the x-axis 256 and the y-axis 258. Some embodiments may keep all components stationary, instead scanning the calibration plate 220 by directing the light from light source 208 along both the x-axis 256 and the y-axis 258 so that the light from light source 208 scans the entire two-dimensional area of the calibration plate 220.

According to some embodiments, calibration plate 220 comprises a surface with a known pattern with regions that either scatter or absorb the light from light source 208. The known pattern may be used as a reference calibration map in x-y space, as defined by x-axis 256 and y-axis 258. The calibration plate 220 may be formed of any one of a list of materials including, but not limited to, metal, plastic, glass, or paper. The known pattern may be formed by processes such as, but not limited to, anodization, laser marking, ink printing, painting, sandblasting, or etching. The known pattern ideally provides maximized contrast between the scattering or absorbing regions formed on the surface of the calibration plate, so that the intensity of light received by the sensor 205 may be indicative of a position on the calibration plate from which the light was reflected. In this manner, the path of the light beam may be measured by the sensor 205.

In the example of FIG. 2C, calibration plate 230 may include the same, or a different calibration pattern from calibration plate 220. In some embodiments, calibration plate 230 may be smaller than calibration plate 220. In some embodiments, calibration plate 230 may be permanently installed into the stereolithographic device. For example, the calibration plate 230 may be mechanically attached to an overhead structure 231. In some embodiments, calibration plate 220 may be installed by a user into the space in which a container usually resides during fabrication of a part by the stereolithographic device.

In the example of FIGS. 2A and 2C, the sensor 205 is arranged within the optics module 210 and thereby moves with the other components of the optics module when it moves along axis 256. It will be appreciated that in some embodiments the sensor 205 (or an additional sensor) may be arranged outside of the optics module, such as in a fixed position within the additive fabrication device, and/or may be installed into the optics module or into the additive fabrication device during the calibration operation.

Figure 3:
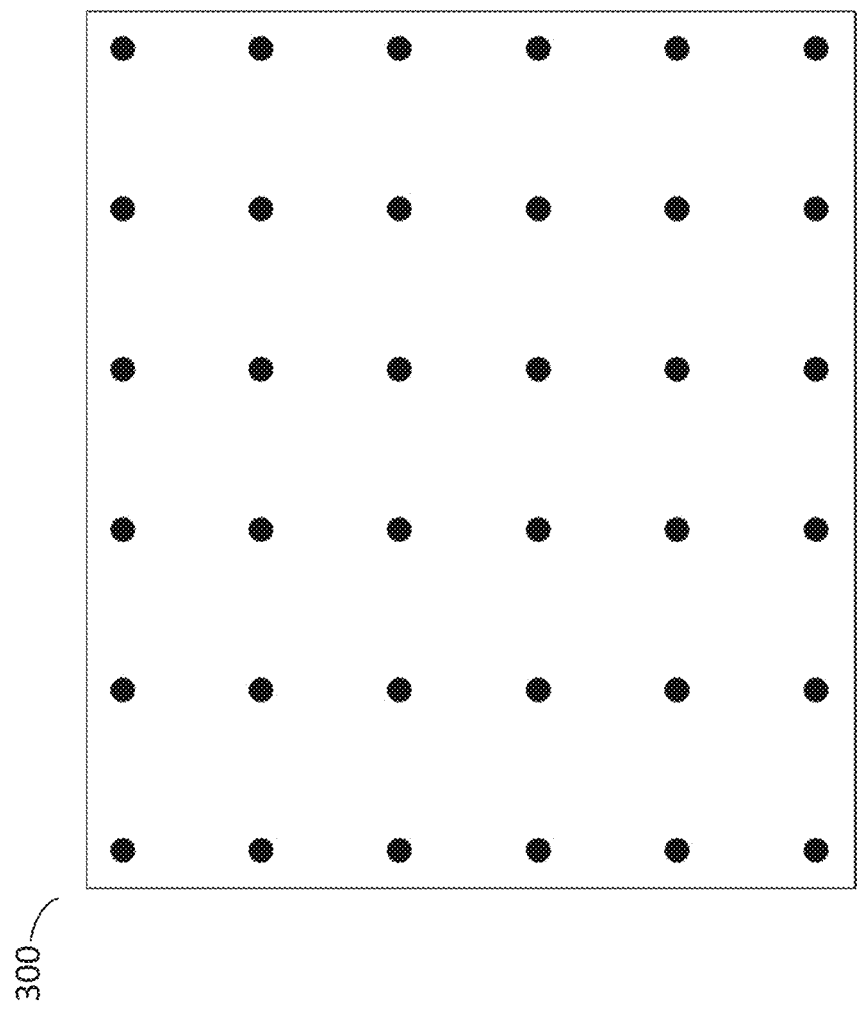
FIG. 3 depicts an illustrative calibration pattern, according to some embodiments.

FIG. 3 depicts an example of a suitable calibration pattern 300 that may be printed or otherwise disposed on the surface of a calibration plate, such as calibration plate 220 and/or 230. According to some embodiments, a pattern that includes features along two perpendicular axes as shown may be preferable in that it may allow for tracking of light beam movement in both the X and Y axes of the stereolithographic device.

According to some embodiments, the calibration plate 220 may comprise a repeating pattern with fine detail, whereas the calibration plate 230 may comprise any pattern that is in a physically stable location. For instance, while calibration plate 220 may comprise an array of dots as shown in FIG. 3, calibration plate 230 may comprise any pattern, even white noise.

Figure 4A:
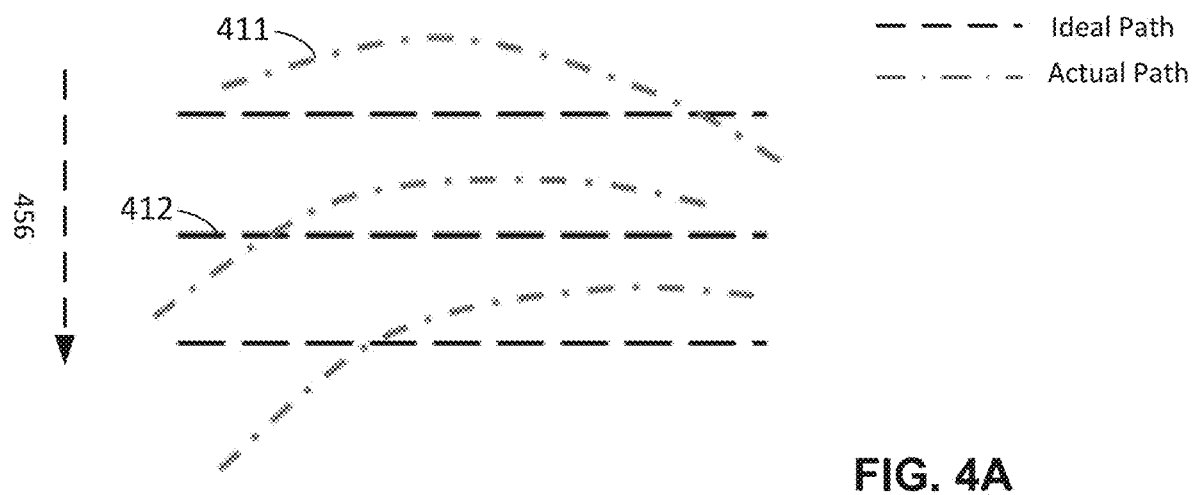
FIGS. 4A-4C depict aspects of calibrating the path of a light beam, according to some embodiments.
Figure 4B:
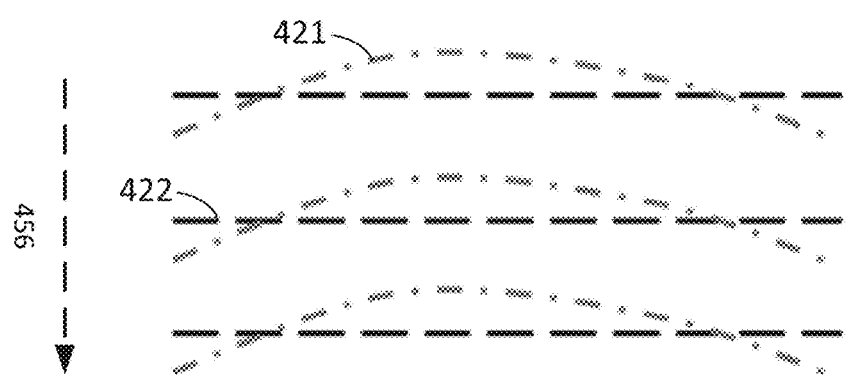
Figure 4C:
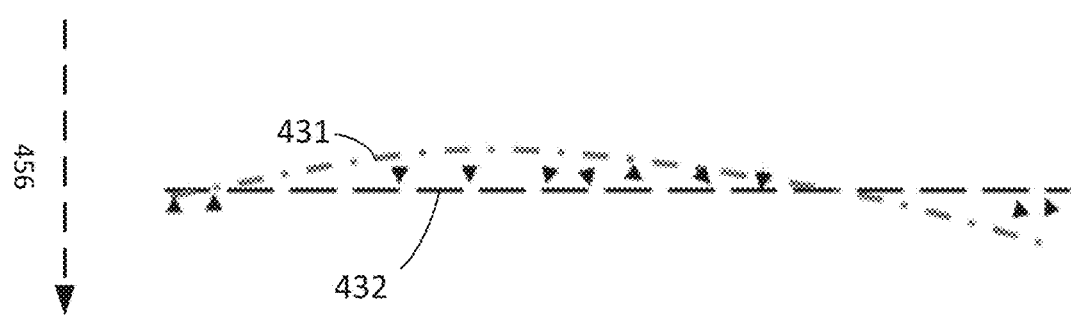

FIGS. 4A-4C depict aspects of calibrating the path of a light beam, according to some embodiments. In some cases, the path of a light beam within a stereolithographic device such as device 100 shown in FIGS. 1A-1D or device 200 shown in FIGS. 2A-2C may not be perfectly straight as a result of one or more manufacturing tolerances of an installed optics module. For example, the path of a light beam may be curved, rotated, shifted, truncated, expanded, or some combination of all of these. In some cases, the beam path may be constant across the linear motion axis (axis 256 as shown in FIGS. 4A-4C), however, the optics module can rotate and/or shift relative to the calibration target as it moves across the print plane due to printer manufacturing tolerances. A beam path exhibiting such effects is shown in FIG. 4A, with path 411 being an example of a non-ideal beam path and path 412 being an ideal path in the absence of these effects.

The beam paths of FIGS. 4A-4C may be detected, as discussed above, by directing light onto a calibration pattern and sensing light scattered from the calibration pattern to determine which positions in the calibration pattern the light is incident upon as a function of the position of the light source and/or the direction in which the light is being directed from the light source.

In FIGS. 4A-4C, the ideal paths are depicted as perpendicular to the axis 456 but may not lie perfectly perpendicular to the axis 456 due to the motion of the optics module during scanning. That is, the beams may be produced by scanning in the Y-axis while the optics module is being moved along the X-axis (axis 456). This may result in an ideal beam path that is slanted slightly along the length of the Y-axis.

In some embodiments, calculations associated with the following calibration operations may be performed by one or more processors of a stereolithographic device, and any data produced from such calculations may be stored on one or more computer readable media of the stereolithographic device.

According to some embodiments, an initial calibration may comprise scanning a calibration pattern (e.g., that of calibration plate 220 shown in FIG. 2A) over the full build area of a stereolithographic device to create a map of the actual beam path over that area. The dashed paths in FIG. 4A represent one example of such a map.

According to some embodiments, a correction for rotations and/or shifts of the optics module during motion along axis 256 may be performed by performing a rigid body fit at each location along the axis. In some cases in which the calibration pattern being scanned is a grid, the rigid body fit may be performed at each location along the grid. The determined fit may be stored as a first calibration map. In some embodiments, the first calibration may represent a best fit of a rigid body fit across the axis.

The first calibration map may be applied to the measured beam path to produce beam paths in which rotations/shifts of the optics module are corrected but a constant error in the beam path may remain, as shown in FIG. 4B.

According to some embodiments, a second correction may be applied to correct for a constant beam path error as shown in FIG. 4B by fitting a high order polynomial to the curve as shown in FIG. 4C. This correction may correct for any curves in the beam path in addition to any angular positioning errors from a mechanical components that directs light along the Y-axis, such as a galvanometer. Curves in the beam path may arise as a result of misalignments and manufacturing tolerances of the optical components (e.g., in a laser, galvanometer, lens(es) and/or mirror(s), etc.) as well as tolerances of the motion system that moves the optics module. The polynomial fit may be stored as a second calibration map.

Figure 5:
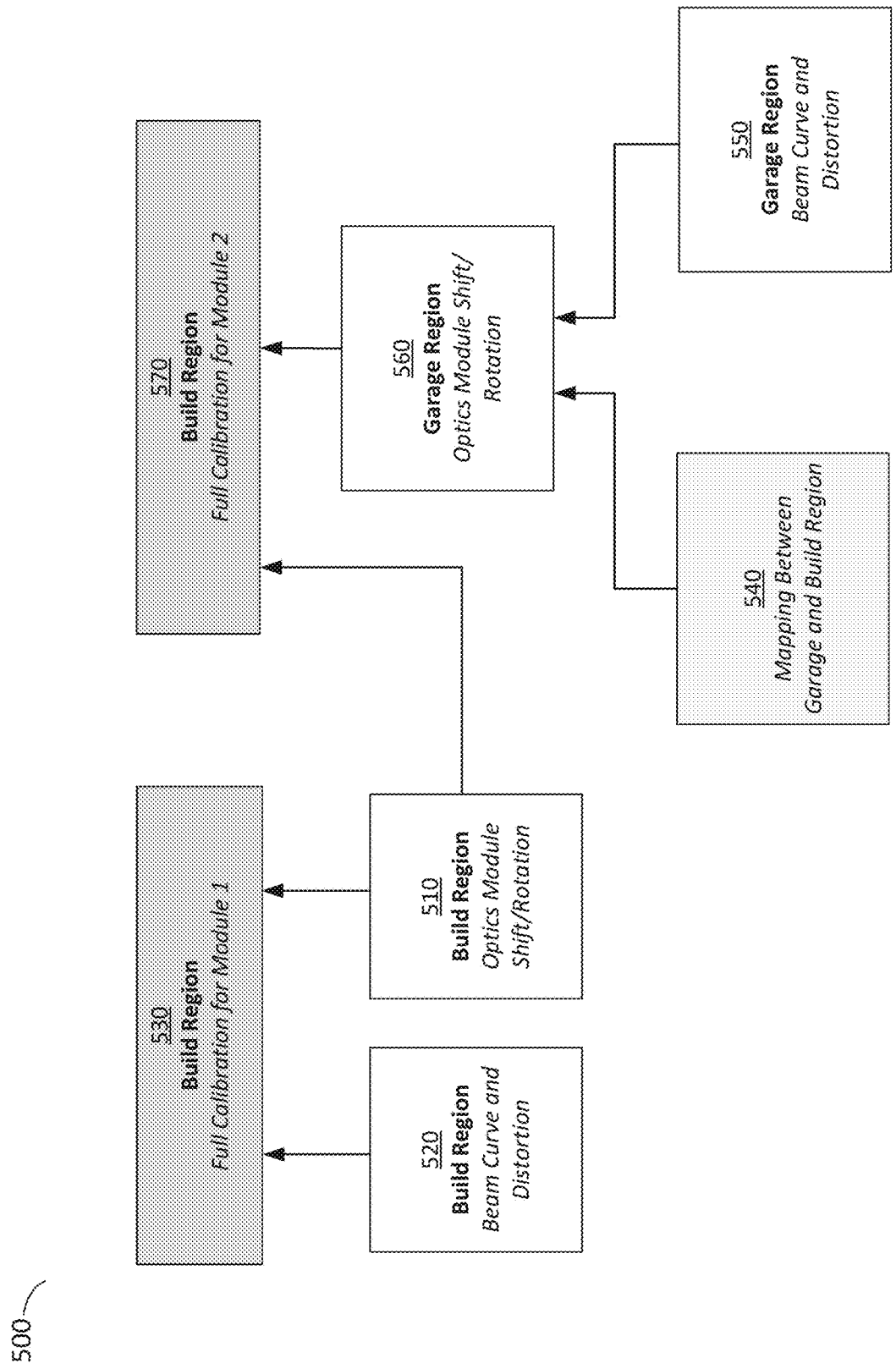
FIG. 5 is a block diagram illustrating relationships between calibration mappings for two optics modules, according to some embodiments.

FIG. 5 is a block diagram illustrating relationships between calibration mappings for two optics modules, according to some embodiments. Diagram 500 depicts relationships between determined calibrations for a first optics module that allow for calibration of a second (e.g., replacement) optics module based on the calibrations for the first optics module and on calibration measurements taken by the second optics module.

As discussed above in relation to FIGS. 4A-4C, initial calibrations may be performed to correct for shifts and/or rotations of an optics module and for any curves and/or distortions of the beam path by scanning a calibration pattern arranged within the build region of the additive fabrication device. These calibrations are represented in FIG. 5 by the calibration mappings 510 and 520, respectively. Together, the mappings can provide for a complete calibration of the first optics module, represented by calibration mapping 530 in FIG. 5.

In the example of FIG. 5, calibration mapping 540 may be generated by scanning a calibration pattern arranged within a garage region of the stereolithographic device. The calibration pattern of the garage may exhibit a rotation, shift (resulting from mechanical misalignment of the garage pattern relative to the build region pattern) and/or a grid distortion relative to the calibration target scanned in the build region (which exhibits the mapping relative to the ideal path) to generate calibration mappings 510 and 520. A calibration mapping 540 between the garage and the build region may thereby be generated and stored in the stereolithographic device. This mapping may represent a physical attribute of the stereolithographic device as it represents a coordinate transformation between the garage and the build region.

Calibration mappings 510, 520, 530 and 540 may be generated through the above operations and stored within the stereolithographic device. In some embodiments, the process of calibration may be performed during initial installation of the first optics module (e.g., at a factory during assembly). Subsequent calibration operations described below may not rely on a calibration pattern located within the build region and accordingly a second module may be calibrated without it being necessary for a user to install a calibration pattern. Rather, the stereolithographic device may scan the calibration pattern already fixed within the garage to determine the necessary calibration information. In some cases, however, an additional calibration scan over some or all of the build region may be performed.

In particular, upon installation of a second optics module, the stereolithographic device may be operated to scan the calibration pattern within the garage to calibration for beam curve and distortion of the second optics module. For example, the above-described process to produce calibration data 520 may be performed. This process produces calibration mapping 550.

In the example of FIG. 5, calibration mapping 560, which represents the rotation and shift of the second optics module, may be generated based on the measured calibration mapping 550 and the previously stored calibration mapping 540 that relates the garage coordinate space to the build area coordinate space.

According to some embodiments, calibration mapping 560 may be generating as follows. The calibration mapping 530 is generated, as discussed above, from calibration mappings 510 and 520. The newly measured calibration mapping 550 represents the calibration of the beam curve and distortion of the second optics module, just as calibration mapping 520 represents the beam curve and distortion of the first optics module. To optimize the component of the full calibration of the second optics module that represents the optics module shift and/or rotation, the full calibration for the first module may be modified to replace calibration mapping 520 with calibration mapping 550. The mapping of the modified full calibration that represents the optics module shift and/or rotation can then be optimized with the constraint of the original calibration mapping 530 and the calibration mapping 550 to minimize error and thereby generate calibration mapping 560.

In the example of FIG. 5, a full calibration mapping for the second optics module 570 may then be generated from the previously determined calibration mapping 510, representing the shift and/or rotation of the motion of an optics module, and the generated calibration mapping 560.

Figure 6:
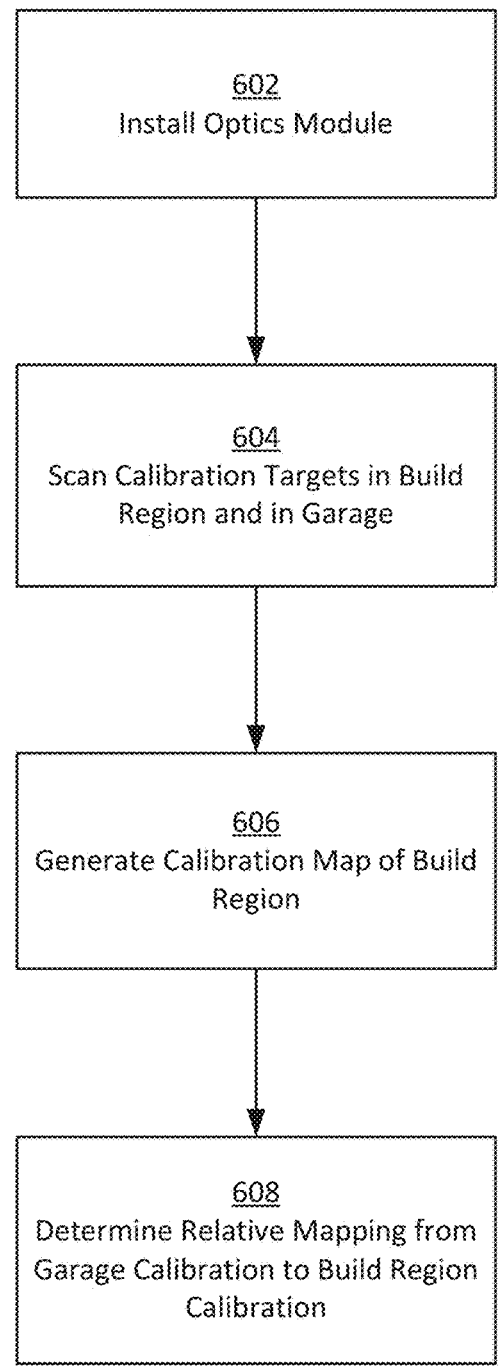
FIG. 6 is a method of calibrating a first optics module of a stereolithographic device, according to some embodiments.

FIG. 6 is a flowchart of a method of calibrating a first optics module of a stereolithographic device, according to some embodiments. Method 600 describes the steps of generating the above-described calibration data during installation of a first optics module, and may be performed by one or more processors, such as one or more processors installed within a stereolithographic device. In act 602, the optics module is installed and in act 604 calibration targets are scanned in the garage and in the build region of the stereolithographic device. In act 606, a calibration map of the build region may be determined as discussed above (e.g., maps 510, 520 and 530 may be generated). In act 608, relative mapping 540 may be generated based on data from scanning the build region and garage.

Figure 7:
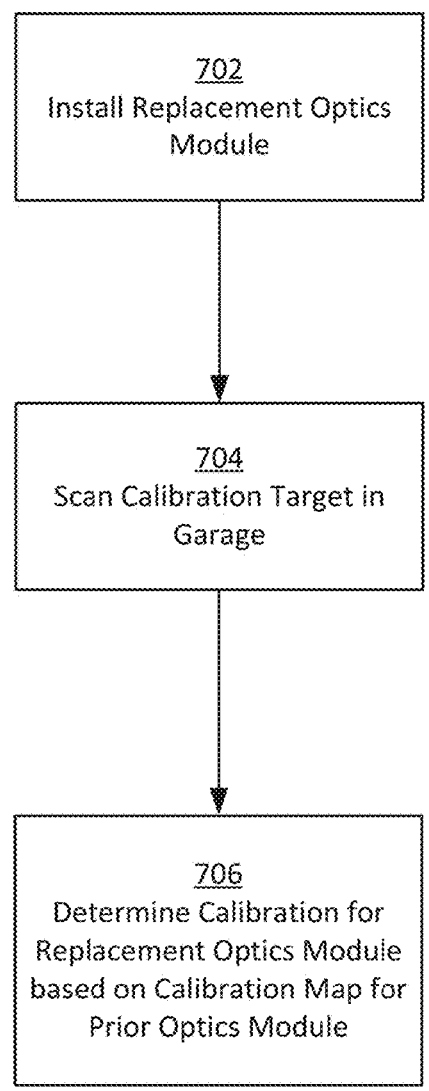
FIG. 7 is a method of calibrating a first second module of a stereolithographic device, according to some embodiments.

FIG. 7 is a method of calibrating a first second module of a stereolithographic device, according to some embodiments. Method 700 describes the steps of generating the above-described calibration data during installation of a second optics module, and may be performed by one or more processors, such as one or more processors installed within a stereolithographic device. In act 702, a replacement (e.g., second) optics module is installed. As discussed above, such an installation may be performed by a user in the field and may not require return or replacement of the stereolithographic device. In act 704, a calibration target installed within the garage of the stereolithographic device is scanned, and in act 706 this scan data is utilized to generate calibrations 550, 560 and 570.

Techniques for scanning a calibration pattern may include any of the techniques described in U.S. application Ser. No. 15/865,421, filed on Jan. 9, 2018 and titled "Optical Sensing Techniques for Calibration of an Additive Fabrication Device and Related Systems and Methods," which is hereby incorporated by reference in its entirety.

While the examples of FIGS. 2A-2C, 5, 6 and 7 relate to an additive fabrication device that includes a light source housed within a movable optics module, as discussed above some additive fabrication devices may comprise a fixed light source. In such a case, the fixed light source may be replaced and then calibration in the same manner as discussed above. One difference in process in the case of a fixed light source compared with the movable light source described above, is that there is no "garage" calibration pattern in the case of a fixed light source, since the light source cannot move beneath a garage structure. The use of two different calibration patterns remains the same in each case, however. The two calibration patterns for the fixed light source case may be arranged at different heights (e.g., different distances from the fixed light source), allowing the difference in scanning at different heights to provide information that would otherwise have been attained by moving the light source as in the example of the movable light source.

Figure 10:
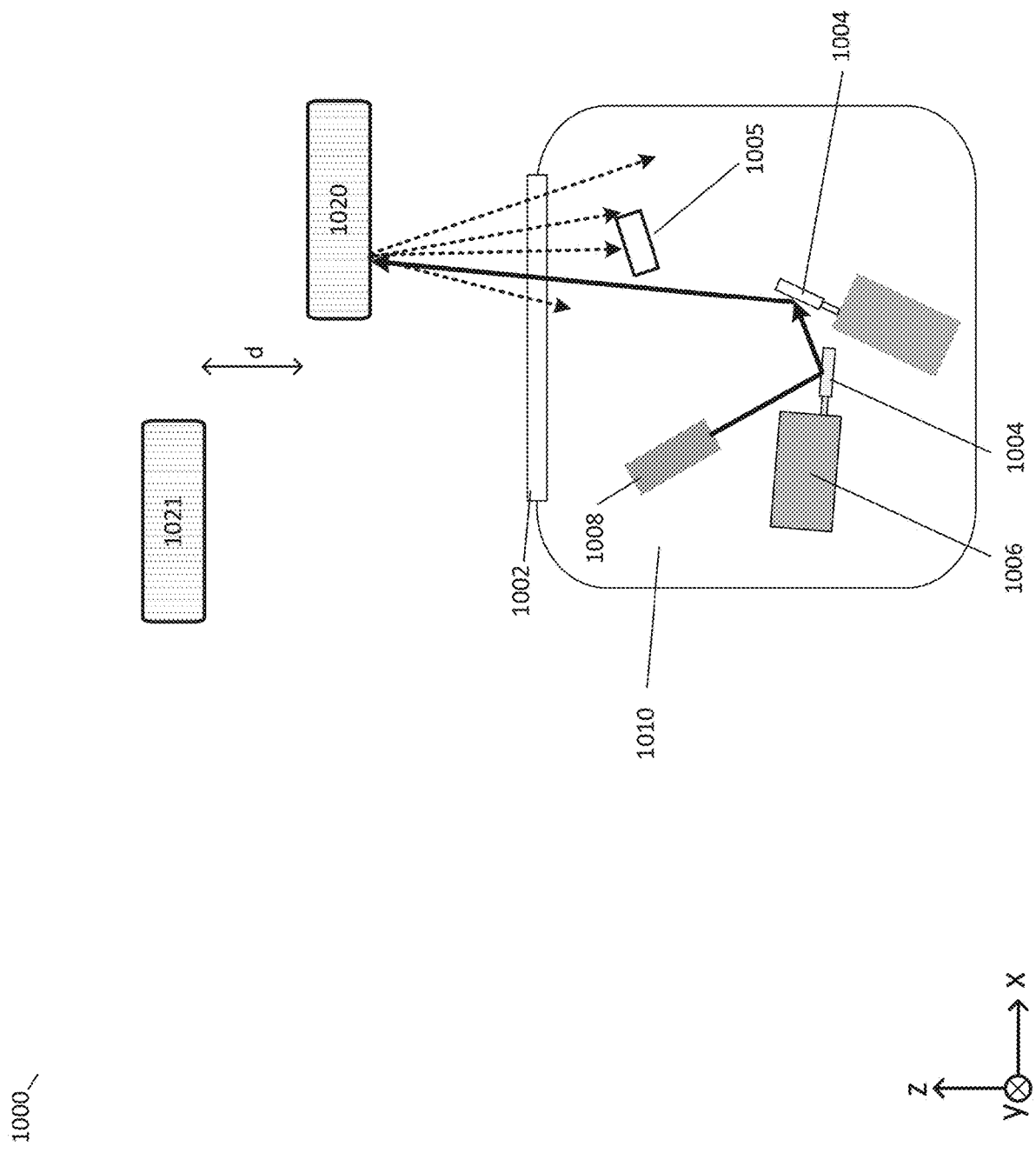
FIG. 10 depicts a schematic view of optically scanning fiducial targets of a stereolithographic device comprising a fixed optics module, according to some embodiments.

FIG. 10 depicts a schematic view of optically scanning fiducial targets of a stereolithographic device comprising a fixed optics module, according to some embodiments. As discussed above, the calibration techniques described herein may be applied in an additive fabrication device in which the optics module is fixed in place and in which light is directed along multiple axes via suitable optics. System 1000 in the example of FIG. 10 comprises an optics unit 1010 that may be operated to scan calibration patterns 1020 and 1021 arranged within a build region of the stereolithographic device. In the example of FIG. 10, the calibration patterns 1020 and 1021 are separated in the z-direction by a known distance d.

In FIG. 10, light source 1008 of the optics unit 1010 is arranged to direct light onto optical components 1004a and 1004b, which may each be, as a non-limiting example, a mirror and/or a lens. In some embodiments, the components 1004a and 1004b may be mirrors controlled by mirror galvanometers 1006a and 1006b, respectively. Irrespective of their implementation, control of the components 1006a and 1006b may direct light from the light source 1008 to a desired location along the x and y-axes of the system.

The light is directed towards the optical window 1002 by the optical components 1004a and 1004b, and may pass through the optical window onto the calibration plate 1020 and/or onto the calibration plate 1021. Light incident upon the calibration plate 1020 and/or 1021 may be reflected back through the optical window 1002, and light sensor 1005 may receive at least some of the reflected light. At least one controller (not shown) coupled to the light sensor may determine a path of the light beam as incident onto the calibration plate based on the known position and direction of the light beam emitted onto the calibration plate and based on the intensity of the reflected light received. Although sensor 1005 is shown in the example of FIG. 10 as being within the replaceable optics module 1010, it will be appreciated that in some embodiments the sensor 1005 (or an additional sensor) may be arranged outside of the optics module within the additive fabrication device, and/or may be installed during the calibration operation.

By arranging two calibration plates at different known heights along the z-axis and scanning both using the optics module 1010, calibration of the optics module may be performed without moving the optics module or the calibration plates. While in the example of FIG. 10 the two calibration plates 1020 and 1021 are depicted as being parallel flat plates, there is no requirement that this is the case. For instance, one of the calibration plates 1020 or 1021 could comprise an "L-shaped" plate. Each of the calibration plates 1020 and 1021 may be arranged at any suitable location(s) within the additive fabrication device, including on a container of the additive fabrication device, on an insertable plate, etc. For instance, the calibration plates 1020 and 1021 may be implemented, respectively, via a calibration pattern disposed on the underside of a container of the additive fabrication device (e.g., container 906), and on a build platform (e.g., build platform 904).

Figure 11:
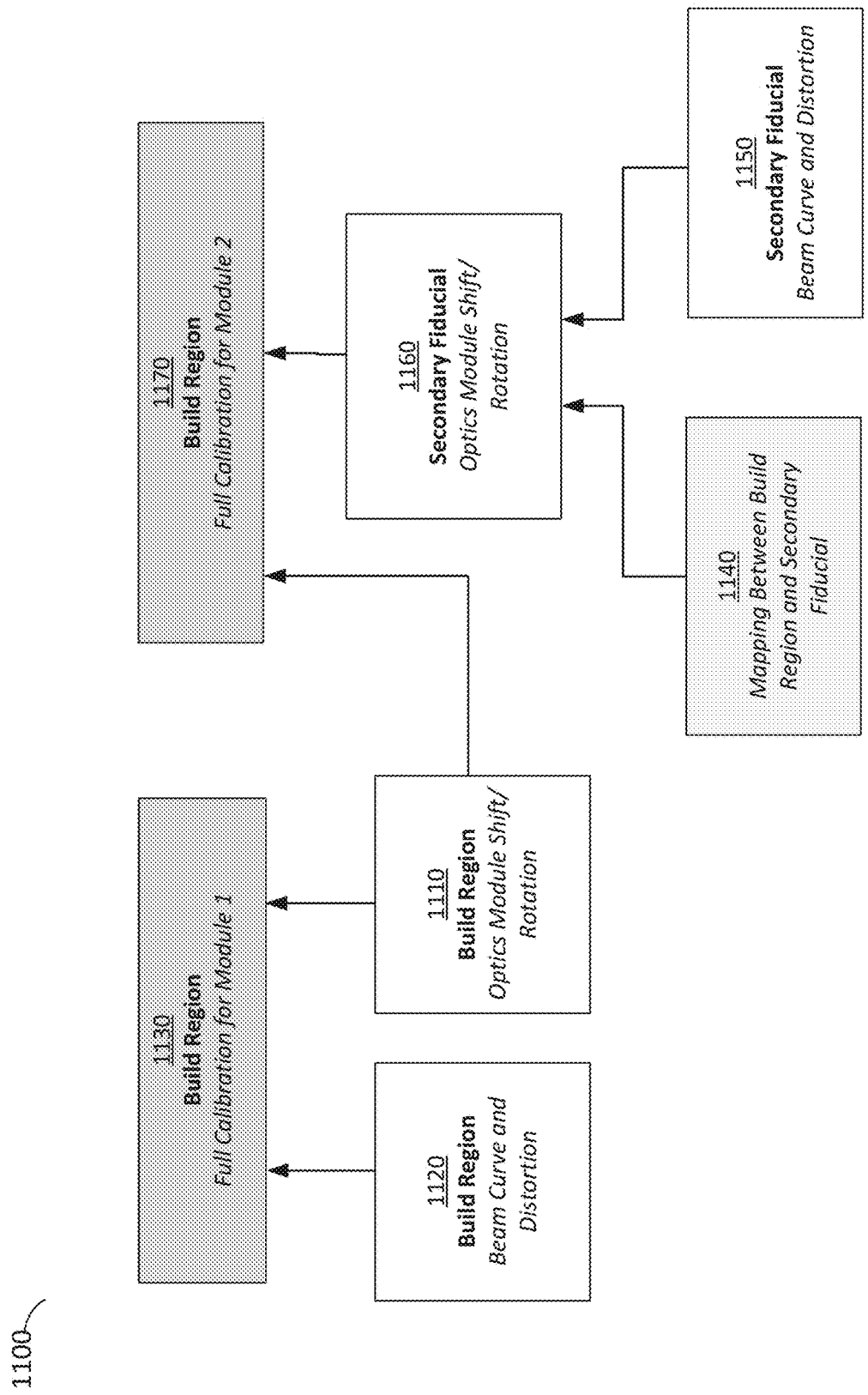
FIG. 11 is a block diagram illustrating relationships between calibration mappings for two optics modules, according to some embodiments.

FIG. 11 is a block diagram illustrating relationships between calibration mappings for two optics modules, according to some embodiments. Diagram 1100 depicts relationships between determined calibrations for a first optics module that allow for calibration of a second (e.g., replacement) optics module based on the calibrations for the first optics module and on calibration measurements taken by the second optics module.

As discussed above in relation to FIGS. 4A-4C, initial calibrations may be performed to correct for shifts and/or rotations of an optics module and for any curves and/or distortions of the beam path by scanning a calibration pattern arranged within the build region of the additive fabrication device. These calibrations are represented in FIG. 11 by the calibration mappings 1110 and 1120, respectively. Together, the mappings can provide for a complete calibration of the first optics module, represented by calibration mapping 1130 in FIG. 11.

In the example of FIG. 11, calibration mapping 1140 may be generated by scanning a secondary calibration pattern— referred to as a secondary fiducial—of the stereolithographic device, which may include calibration patterns at different known heights in the additive fabrication device as shown in FIG. 10. The secondary fiducial may exhibit a rotation, shift (resulting from mechanical misalignment of the secondary fiducial region pattern relative to the build region pattern) and/or a grid distortion relative to the calibration target scanned in the build region (which exhibits the mapping relative to the ideal path) to generate calibration mappings 1110 and 1120. A calibration mapping 1140 between the secondary fiducial and the build region may thereby be generated and stored in the stereolithographic device. This mapping may represent a physical attribute of the stereolithographic device as it represents a coordinate transformation between the secondary fiducial and the build region.

Calibration mappings 1110, 1120, 1130 and 1140 may be generated through the above operations and stored within the stereolithographic device. In some embodiments, the process of calibration may be performed during initial installation of the first optics module (e.g., at a factory during assembly). Subsequent calibration operations described below may not rely on a calibration pattern located within the build region and accordingly a second module may be calibrated without it being necessary for a user to install a calibration pattern. Rather, the stereolithographic device may scan the calibration pattern already fixed within the additive fabrication device (i.e., the secondary fiducial) to determine the necessary calibration information. In some cases, however, an additional calibration scan over some or all of the build region may be performed.

In particular, upon installation of a second optics module, the stereolithographic device may be operated to scan the secondary fiducial to calibration for beam curve and distortion of the second optics module. For example, the above-described process to produce calibration data 1120 may be performed. This process produces calibration mapping 1150.

In the example of FIG. 11, calibration mapping 1160, which represents the rotation and shift of the second optics module, may be generated based on the measured calibration mapping 1150 and the previously stored calibration mapping 1140 that relates the secondary fiducial coordinate space to the build area coordinate space.

According to some embodiments, calibration mapping 1160 may be generating as follows. The calibration mapping 1130 is generated, as discussed above, from calibration mappings 1110 and 1120. The newly measured calibration mapping 1150 represents the calibration of the beam curve and distortion of the second optics module, just as calibration mapping 1120 represents the beam curve and distortion of the first optics module. To optimize the component of the full calibration of the second optics module that represents the optics module shift and/or rotation, the full calibration for the first module may be modified to replace calibration mapping 1120 with calibration mapping 1150. The mapping of the modified full calibration that represents the optics module shift and/or rotation can then be optimized with the constraint of the original calibration mapping 1130 and the calibration mapping 1150 to minimize error and thereby generate calibration mapping 1160.

In the example of FIG. 11, a full calibration mapping for the second optics module 1170 may then be generated from the previously determined calibration mapping 1110, representing the shift and/or rotation of the motion of an optics module, and the generated calibration mapping 1160.

Figure 12:
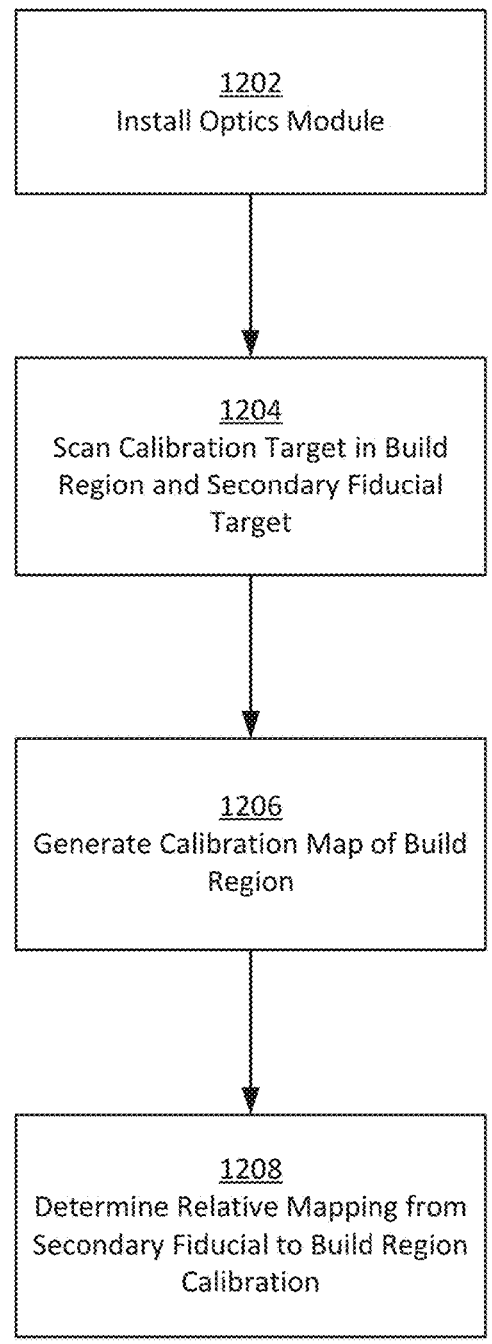
FIG. 12 is a flowchart of a method of calibrating a first optics module of a stereolithographic device, according to some embodiments.

FIG. 12 is a flowchart of a method of calibrating a first optics module of a stereolithographic device, according to some embodiments. Method 1200 describes the steps of generating the above-described calibration data during installation of a first optics module, and may be performed by one or more processors, such as one or more processors installed within a stereolithographic device. In act 1202, the optics module is installed and in act 1204 calibration targets are scanned in the build region of the stereolithographic device, and the secondary fiducial target is scanned. In act 1206, a calibration map of the build region may be determined as discussed above (e.g., maps 1110, 1120 and 1130 may be generated). In act 1208, relative mapping 1140 may be generated based on data from scanning the build region and the secondary fiducial.

Figure 13:
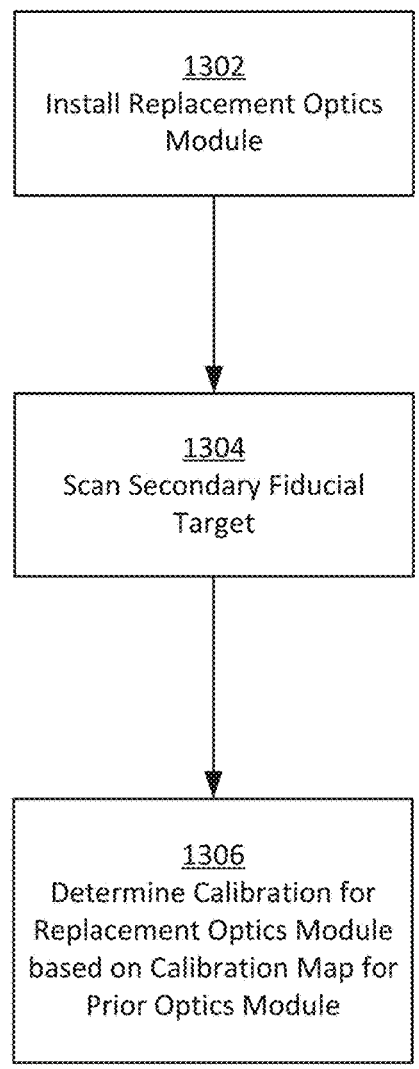
FIG. 13 is a method of calibrating a first second module of a stereolithographic device, according to some embodiments.

FIG. 13 is a method of calibrating a first second module of a stereolithographic device, according to some embodiments. Method 1300 describes the steps of generating the above-described calibration data during installation of a second optics module, and may be performed by one or more processors, such as one or more processors installed within a stereolithographic device. In act 1302, a replacement (e.g., second) optics module is installed. As discussed above, such an installation may be performed by a user in the field and may not require return or replacement of the stereolithographic device. In act 1304, a secondary fiducial target of the stereolithographic device is scanned, and in act 1306 this scan data is utilized to generate calibrations 1150, 1160 and 1170.

Figure 8:
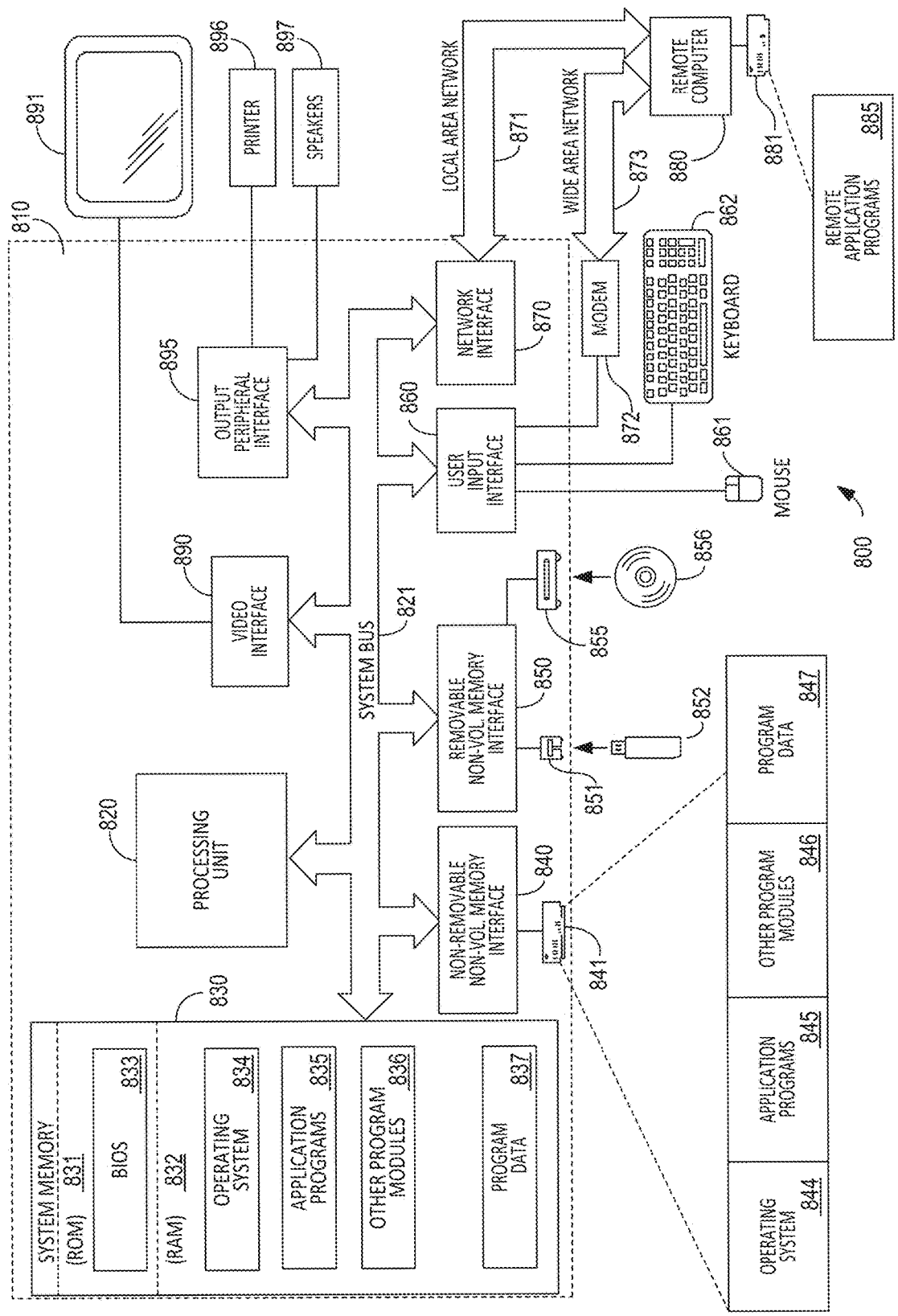
FIG. 8 illustrates an example of a computing system environment on which aspects of the invention may be implemented.

FIG. 8 illustrates an example of a suitable computing system environment 800 on which the technology described herein may be implemented. The computing system environment 800 is only one example of a suitable computing environment and is not intended to suggest any limitation as to the scope of use or functionality of the technology described herein. Neither should the computing environment 800 be interpreted as having any dependency or requirement relating to any one or combination of components illustrated in the exemplary operating environment 800.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

What is claimed is:

1. A method of calibrating an optics module for an additive fabrication device, the method comprising:
   directing light from a light source of an optics module onto a plurality of locations on a calibration pattern within the additive fabrication device, the optics module comprising the light source,
   wherein directing the light from the light source of the optics module onto the plurality of locations on the calibration pattern comprises moving the optics module along a first axis while directing light along a second axis perpendicular to the first axis;
   receiving light reflected and/or scattered from the plurality of locations on the calibration pattern by a light sensor;
   determining, using at least one processor based on the light received by the light sensor, a beam path traversed by the light from the light source; and
   determining, using the at least one processor, at least one correction to the determined beam path based at least in part on deviations of the determined beam path from a desired beam path.

2. The method of claim 1, wherein the optics module is a second optics module, and wherein the method further comprises:
   removing a first optics module from the additive fabrication device; and
   installing the second optics module in the additive fabrication device.

3. The method of claim 2, further comprising determining at least one correction to a beam path of a light source of the first optics module prior to removing the first optics module from the additive fabrication device,
   and wherein determining the at least one correction to the determined beam path traversed by the light from the light source of the second optics module is further based on the determined at least one correction to the beam path of the light source of the first optics module.

4. The method of claim 1, wherein the optics module comprises a mirror galvanometer configured to be operated to direct the light along the plurality of directions along the second axis.

5. The method of claim 1, wherein the calibration pattern is a first calibration pattern, and wherein the method further comprises:
   directing light from the light source of the optics module onto a plurality of locations on a second calibration pattern within the additive fabrication device while moving the optics module along the first axis.

6. The method of claim 1, wherein the calibration pattern comprises a plurality of dots arranged in a two-dimensional array.

7. The method of claim 1, wherein optics module comprises the light sensor.

8. An additive fabrication device comprising:
   an optics module comprising a light source and a light sensor and configured to move along a first axis while directing light along a second axis perpendicular to the first axis;
   a calibration pattern;
   at least one processor; and
   at least one computer readable medium comprising instructions that, when executed by the at least one processor, performs a method comprising:
     directing light from the light source of the optics module onto a plurality of locations on the calibration pattern while moving the optics module along the first axis;
     determining, based on light received by the light sensor of the optics module, a beam path traversed by the light from the light source; and
     determining at least one correction to the determined beam path based at least in part on deviations of the determined beam path from a desired beam path.

9. The additive fabrication device of claim 8, wherein the calibration pattern comprises a plurality of dots arranged in a two-dimensional array.

10. The additive fabrication device of claim 8, wherein the optics module comprises a mirror galvanometer configured to be operated to direct the light along the plurality of directions along the second axis.

11. The additive fabrication device of claim 8, wherein the additive fabrication device comprises a container, and wherein the calibration pattern is arranged adjacent to the container such that the container and calibration pattern do not overlap along the first axis.

12. A method of calibrating an optics module for an additive fabrication device comprising a light source and a light sensor, the method comprising:
   directing light from the light source onto a plurality of locations on a first calibration pattern within the additive fabrication device;

receiving light reflected and/or scattered from the plurality of locations on the first calibration pattern by the light sensor;

directing light from the light source onto a plurality of locations on a second calibration pattern within the additive fabrication device, the second calibration pattern being arranged further from the light source than the first calibration pattern;

receiving light reflected and/or scattered from the plurality of locations on the second calibration pattern by the light sensor;

determining, using at least one processor based on the light received by the light sensor from the first calibration pattern and based on the light received by the light sensor from the second calibration pattern, a beam path traversed by the light from the light source; and determining, using the at least one processor, at least one correction to the determined beam path based at least in part on deviations of the determined beam path from a desired beam path.

13. The method of claim 12, wherein the calibration pattern comprises a plurality of dots arranged in a two-dimensional array.

14. The method of claim 12, wherein the optics module is configured to direct light along a plurality of directions along a first axis and a plurality of directions along a second axis, perpendicular to the first axis.

15. The method of claim 12, wherein the first and second calibration patterns are arranged on the surface of one or more components of the additive fabrication device.

* * * * *